US006928202B2

United States Patent
Pickrell et al.

(10) Patent No.: US 6,928,202 B2
(45) Date of Patent: Aug. 9, 2005

(54) METHOD AND APPARATUS FOR PACKAGING OPTICAL FIBER SENSORS FOR HARSH ENVIRONMENTS

(75) Inventors: Gary Pickrell, Blacksburg, VA (US); Yuhong Duan, Dekalb, IL (US); Anbo Wang, Blacksburg, VA (US)

(73) Assignee: Virgina Tech Intellectual Properties, Inc., Blacksburg, VA (US)

( * ) Notice: Subject to any disclaimer, the term of this patent is extended or adjusted under 35 U.S.C. 154(b) by 122 days.

(21) Appl. No.: 10/689,552

(22) Filed: Oct. 21, 2003

(65) Prior Publication Data

US 2004/0223679 A1 Nov. 11, 2004

Related U.S. Application Data

(60) Provisional application No. 60/419,535, filed on Oct. 21, 2002.

(51) Int. Cl.[7] .................................................. G02B 6/44
(52) U.S. Cl. ............................. 385/12; 385/66; 385/107
(58) Field of Search ............................. 385/12–13, 66, 385/75, 107

(56) References Cited

U.S. PATENT DOCUMENTS 5,261,018 A * 11/1993 Suganuma et al. ............ 385/51
6,240,231 B1 * 5/2001 Ferrera et al. ............... 385/115
6,396,572 B1 * 5/2002 Chang et al. ............... 356/35.5

* cited by examiner

Primary Examiner—Akm Enayet Ullah
Assistant Examiner—Jerry T Rahll
(74) Attorney, Agent, or Firm—Whitham, Curtis & Christofferson, P.C.

(57) ABSTRACT

A package for an optical fiber sensor having a metal jacket surrounding the sensor, and heat-shrink tubing surrounding the metal jacket. The metal jacket is made of a low melting point metal (e.g. lead, tin). The sensor can be disposed in a rigid tube (e.g. stainless steel or glass) that is surrounded by the metal jacket. The metal jacket provides a hermetic, or nearly hermetic seal for the sensor. The package is made by melting the metal jacket and heating the heat shrink tubing at the same time. As the heat-shrink tubing shrinks, it presses the low melting point metal against the sensor, and squeezes out the excess metal.

24 Claims, 3 Drawing Sheets

US 6,928,202 B2

METHOD AND APPARATUS FOR PACKAGING OPTICAL FIBER SENSORS FOR HARSH ENVIRONMENTS

CROSS-REFERENCE TO RELATED APPLICATIONS

This application claims priority to U.S. Provisional Patent Application 60/419,535 filed on Oct. 21, 2002, the complete contents of which are herein incorporated by reference.

STATEMENT OF GOVERNMENT INTEREST

This invention was made with government support under Contract Number DE-FT26-98BC15167 awarded by the U.S. Department of Energy. The Government has certain rights in the invention.

FIELD OF THE INVENTION

The present invention relates generally to optical fiber sensors. More particularly, the present invention provides a method and apparatus for packaging optical fiber sensors which may be used in an oil well downhole, or in other harsh environments. The package employs a low melting point metal jacket inside heat shrink tubing.

BACKGROUND OF THE INVENTION

Optical fiber sensors are employed for measuring temperature, pressure or other physical parameters. Optical fiber sensors are sometimes employed in extreme environments where they can outperform conventional electronic sensors. For example, optical fiber sensors can measure temperature and pressure in the environment of an oil well downhole. The downhole environment is a challenging place to locate an optical fiber sensor because of mechanical shock, chemical corrosion, thermal degradation, and water penetration that can occur. In order to provide a downhole optical sensor, the sensor must be packaged to protect it from these threats. Additionally, the sensor package must have a small size because space is limited in the downhole environment.

Accordingly, there is presently a need for packages for optical fiber sensors that are suitable for harsh environments such as a downhole environment. The package must provide chemical, mechanical and thermal protection. Also, it is preferable for the package to be simple to fabricate and inexpensive.

SUMMARY OF THE INVENTION

The present invention includes a fiber optic sensor package that is well-suited for use in harsh environments such as a downhole environment.

The present optical fiber sensor package includes a sensor with a metal jacket surrounding the sensor. The metal jacket is made of low melting point metal and has a shape formed by melting and refreezing (solidifying) in contact with a shrunken heat shrink tubing. The package may further comprise the heat shrink tubing surrounding the metal jacket.

The metal jacket can be made of low melting point metals such as lead, tin, bismuth, indium and alloys thereof.

The package may further comprise a rigid tube within the metal jacket and surrounding the sensor.

The metal jacket may have a meting temperature less than 250, 300, 350, or 400 degrees Celsius, for example.

The metal jacket preferably has a melting temperature less than the shrinking temperature of the heat shrink tubing.

The present invention includes a method for making the present sensor package. The present sensor package is made by disposing the sensor and the low melting point metal into the heat shrink tube and heating the tube and metal so that the metal melts and the tube shrinks. This causes the tube to press the metal against the sensor. The location of applied heat can be scanned across the sensor to minimize the amount of air trapped within the package.

DETAILED DESCRIPTION OF THE PREFERRED EMBODIMENTS OF THE INVENTION

The present invention provides a fiber optic sensor package that is inexpensive and suitable for use in harsh environments such as a downhole environment (e.g. oil well). The present package provides exceptional mechanical and chemical protection, and is compatible for use at high pressure. Also, the present package is simple and inexpensive to fabricate, and can be used with a wide range of fiber optic sensors.

The present fiber sensor package has a optical fiber sensor within a metal jacket made of low melting point metal (e.g. lead, tin, indium or their alloys) surrounded by a shrunken heat shrink tubing. The heat shrink tubing is shrunken while the low melting point metal is in a molten state, thereby squeezing out excess metal (if any). The low melting point metal jacket provides an inexpensive and durable coating that, in combination with the heat shrink tubing provides mechanical and chemical protection. Preferably, the metal has a melting point equal to or lower than the temperature required to make the heat-shrink tubing shrink. Optionally, the package can have a rigid tubing (e.g. made of glass, quartz, ceramic, stainless steel or the like) disposed between the sensor and the low melting point metal. The fiber optic sensor can have a Bragg grating, Fabry-Perot cavity, special optical coatings or other structures designed to provide sensing capability. The present package is compatible with a wide range of fiber sensors.

Figure 1:
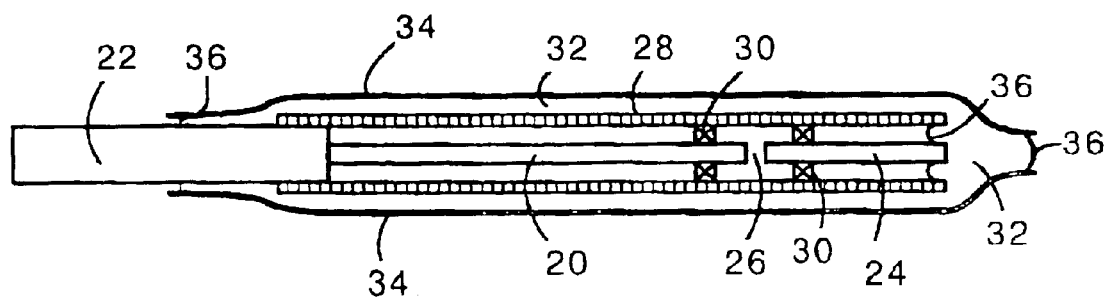
FIG. 1 shows an exemplary embodiment of the present optical fiber sensor package.

FIG. 1 shows a cross sectional view of an optical fiber sensor package according to the present invention. The present package includes an optical fiber 20 having a buffer coating 22. A fiber stub 24 is provided in-line with the optical fiber 20 to define a Fabry-Perot cavity 26 (as an exemplary embodiment). The cavity 26 can be used to interferometrically detect parameters such as temperature or pressure, as known in the art. A rigid tube 28 is provided over the optical fiber 20 and stub 24; the tube 28 can be made of silica, ceramic or stainless steel for example. Bonds 30 are provided between the tube 28 and stub 24 and optical fiber 20 to hold the fiber 20 and stub 24 fixed within the tube 28.

According to the present invention, a low melting point metal jacket 32 is provided over the rigid tube 28. A shrunken heat-shrink tube 34 is provided over the metal jacket 32. The metal jacket 32 has a shape formed by the heat-shrink tube 34 while it is in the molten state. Accordingly, the metal jacket 32 will typically have meniscuses 36 shaped by surface tension forces of the molten metal. It is noted that the rigid tube 28 can be made of a wettable material (e.g. copper) so that the metal jacket 32 is bonded to the tube 28. Additionally, the fibers 20 24 can be metallized so that they are wetted by the metal jacket 32. Also, it is noted that the heat shrink tube 34 can be pinched closed at the end so that the metal jacket is not exposed.

Preferably in the invention, the melting point of the metal jacket 32 is equal to or less than the temperature required to shrink the heat shrink tubing 34, and the melting or disintegration temperature of the rigid tube 28 is in excess of the melting temperature of the metal jacket and the temperature required to shrink the heat shrink tubing 34. The heat shrink tubing accordingly forms and shapes the metal jacket 32 during the shrinking process. As a result, the thickness of the metal jacket 32 between the rigid tubing 28 and heat shrink tubing 34 can be for example less than 1 mm thick. The thickness of the metal jacket can also be a thin, foil type layer less than 100 or 200 microns thick.

The metal jacket 32 can be made of many different metals or alloys having a relatively low melting temperature (e.g. less than 250, 300, 350 or 400 degrees Celsius). The metal jacket 32 can be made of lead, tin, bismuth, gallium, indium and alloys containing these metals. The metal jacket can also be made of silver-bearing solder alloys (e.g. 95% tin/5% silver alloy), or lead-tin solder alloys. The metal jacket can also be alloyed with high melting temperature metals such as copper, iron, aluminum and the like. High melting temperature metals can be added to alter the melting temperature of the metal jacket, or alter the chemical properties of the metal jacket. For example, the metal jacket can be made of an alloy selected to have a low permeability to water or other substances damaging to the sensor. The composition of the metal jacket should be chosen in accordance with the thermal, mechanical and chemical property requirements of the package.

The heat shrink tubing 34 can be made of any material that shrinks in a radial direction upon heating to a temperature equal to or higher than the melting temperature of the metal. For example, the heat shrink tubing can be made of polytetrafluoroethylene (e.g. TEFLON (trademark of DuPont)) type materials that tend to have a relatively high shrinking temperature of about 327 degrees Celsius, polyolefin type materials that shrink at about 95 degrees Celsius, or other heat-shrink materials that shrink at temperatures in the range of 95–350 degrees Celsius.

The buffer 22 can be any conventional optical fiber buffer, but it preferably comprises a material that is resistant to temperatures used to melt the metal jacket. For example, the buffer can be made of polyimide. The optical fiber can be made of silica or any other conventional optical fiber material that can withstand the temperatures required to melt the metal 32 and shrink the tubing 34. The buffer can be removed prior to forming the present hermetic package.

The fiber endfaces defining the Fabry-Perot cavity can have special coatings to provide desired optical properties needed for specialized sensors. The type of sensor is immaterial to the invention because the present invention is applicable to many different types of optical fiber sensors. For example, the present invention can be used with sensors that do not have a Fabry-Perot cavity.

The bonds 30 can be fusion bonds provided by CO2 laser, or can be bonds provided by adhesives or glass solders, for example. In any case, if bonds 30 are present, they should be resistant to the temperature required to melt the metal jacket material 32 and shrink the heat shrink tubing 34.

In use, the heat shrink tubing 34 and metal jacket 32 provide adequate protection for the fiber sensor in many harsh environments including a downhole environment. While in use, the metal jacket 32 is preferably at a temperature below its melting point so that it remains solid. However, the present invention includes applications where the sensor is used at elevated temperatures where the metal jacket 32 is molten. It is noted that in such applications, the metal jacket 32 will typically not contribute to mechanical protection for the sensor.

Figure 2:
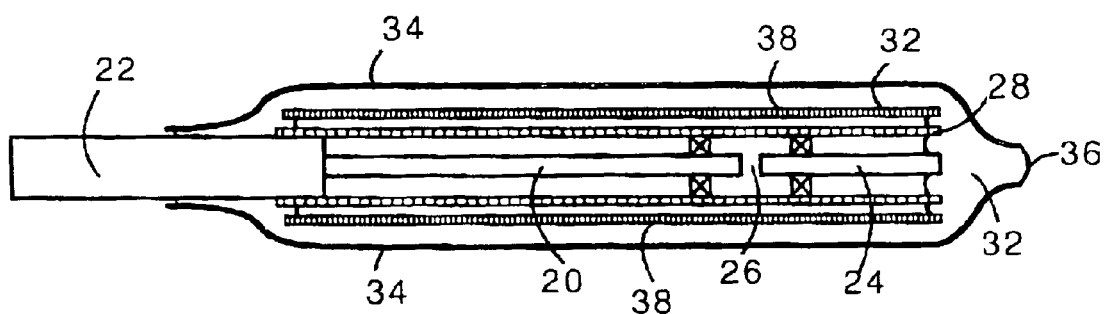
FIG. 2 shows an alternative embodiment having two rigid tubes protecting the optical fiber sensor.

FIG. 2 shows a second embodiment of the present invention in which a second rigid tube 38 is provided between the rigid tube 28 and the heat shrink tubing 34. The second rigid tube can be made of glass, silica, ceramic, metal, plastic or other materials, and can be the same or different as the rigid tube 28. The second rigid tube 38 provides additional mechanical protection and support for the fiber sensor. The metal jacket 32 may or may not fill the space between the first and second rigid tubes.

Figure 3:
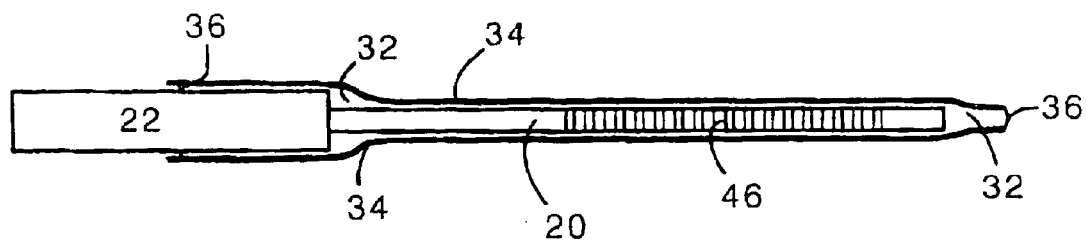
FIG. 3 shows a bare optical fiber sensor packaged according to the present invention.

FIG. 3 shows another embodiment of the present invention employed to package an optical fiber sensor having a Bragg grating 46. In this package no rigid tube is used; the fiber 20 with the Bragg grating 46 is disposed in contact with the metal jacket 32. The optical fiber 20 may be metallized so that it is wetted by the metal jacket 32. The metal jacket 32 is surrounded by the heat shrink tubing 34.

It is noted that the Bragg grating is merely exemplary, and is optional. The fiber sensor can have any structure that provides sensing capability. For example, the optical fiber 20 can have a special coating in its endface that provides sensing capability. Such a sensor can be packaged as illustrated in FIG. 3.

Figure 4:
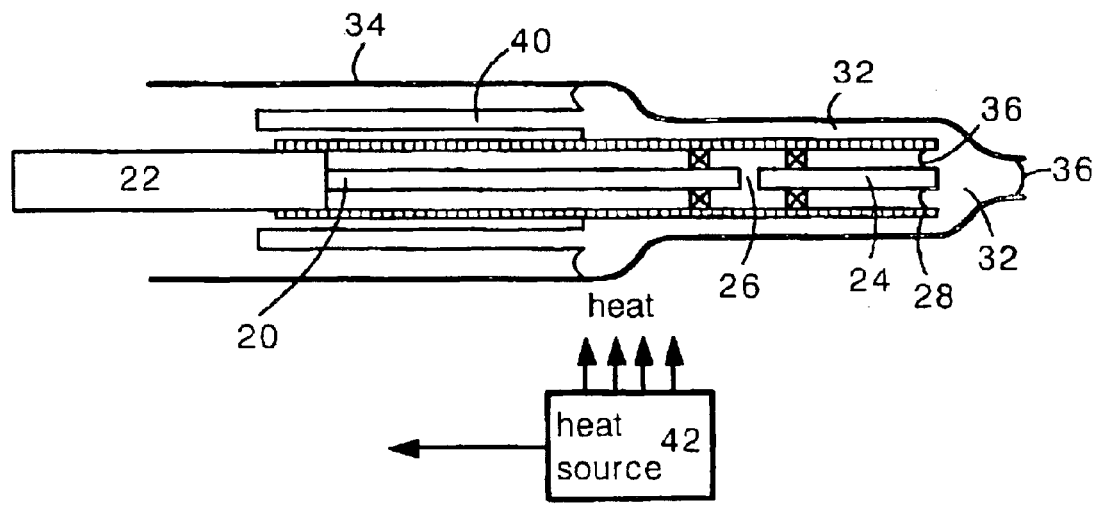
FIG. 4 illustrates a preferred method for making the present sensor package.

FIG. 4 illustrates a preferred method for making the present optical fiber sensor package. In the method, a tube or coil 40 made of the low melting point metal jacket material 32 is provided within the heat shrink tubing 34. A heat source 42 is provided which heats the tube 40 so it melts, and heats the heat shrink tubing 34 so that it shrinks. The heat source is scanned along the sensor (from right to left in FIG. 4) so that the location of applied heat is scanned along the package. Scanning the location of applied heat tends to reduce the quantity of air bubbles trapped within the sensor package. As the heat shrink tubing shrinks, it tends to squeeze out the excess low melting point metal jacket material. Additionally, the package may be positioned vertically (with the heat source scanned upwards) in order to further reduce the quantity of trapped air.

The heat source 42 can be a hot air gun, a flame, an induction heater or any other heat source. Although the heat source 42 is illustrated as moving away from the terminal end of the sensor, the invention is not so limited; heat source 42 can be scanned in either direction. Additionally, the fabrication of the present sensor package (i.e. melting the jacket material and shrinking the tubing) can be performed in vacuum, which will also tend to reduce the amount of air trapped within the package.

Figure 5:
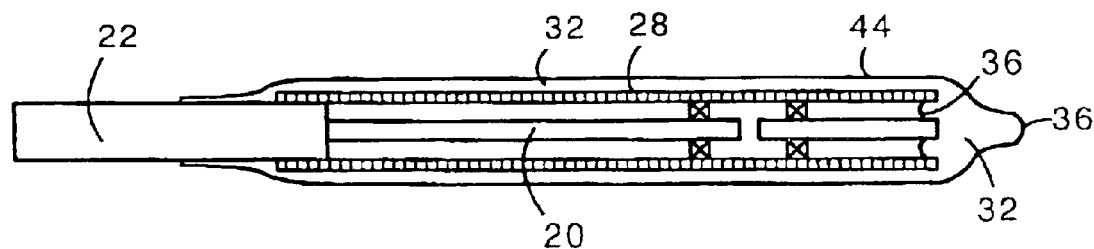
FIG. 5 shows an alternative embodiment that that has the heat shrink tubing removed.

FIG. 5 shows another embodiment in which the heat shrink tubing 34 is removed after the package is assembled.

This embodiment is possible with sensors that have at least one rigid tube 28. In this case, the metal jacket 32 is the outermost layer, and an outer surface 44 of the metal jacket 32 will have a surface defined and shaped by the heat shrink tubing.

Figure 6:
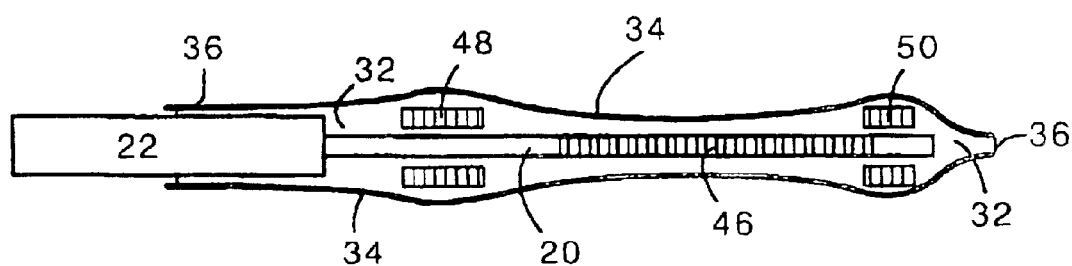
FIG. 6 shows an alternative embodiment having short pieces of tubing for holding the heat shrink open and thereby providing a thicker metal jacket.

FIG. 6 shows another embodiment of the invention having two short pieces of tubing 48 50 disposed around the optical fiber 20. The short pieces of tubing tend to hold the heat shrink away from the fiber than thereby provide a thicker metal jacket 32. If desired three, four or more pieces of tubing can be provided along the length of the fiber to hold the heat shrink 34 away and provide a thicker metal jacket 32. The short pieces of tubing are embedded within the metal jacket 32 Also, the short pieces of tubing 48 50 can be provided in the embodiments of FIGS. 1, 2, or 3. In this case, the pieces of tubing 48 50 would be provided around the rigid tubes 28 38.

Figure 7:
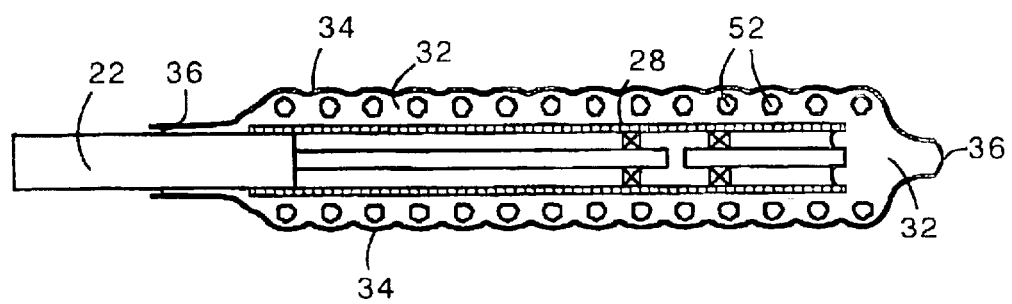
FIG. 7 shows an alternative embodiment having a coil for holding the heat shrink open and thereby providing a thicker metal jacket with more accurate thickness.

FIG. 7 shows yet another embodiment having a coil of non-melting wire (e.g. spring) 52 wound around the rigid tube 28. The coil can be made of copper, aluminum, steel, brass, bronze or similar materials. Preferably, the coil is made of a material that can be easily wetted by the low melting point metal of the metal jacket 32 (e.g. copper, bronze, or brass). The coil is embedded within the metal jacket 32. The coil assures that the metal jacket 32 has a uniform and well-controlled thickness. If the coil 52 is not present, then the heat shrink tubing 34 can in some cases squeeze out too much of the metal jacket material.

It will be clear to one skilled in the art that the above embodiment may be altered in many ways without departing from the scope of the invention. Accordingly, the scope of the invention should be determined by the following claims and their legal equivalents.

What is claimed is:

1. A package for an optical fiber sensor, comprising:
   a) an optical fiber sensor;
   b) a metal jacket surrounding the sensor, wherein:
   the metal jacket is made of low melting point metal,
   the metal jacket is formed by melting and refreezing, and
   wherein an outer surface of the metal jacket is shaped by contact with shrunken heat-shrink tubing when in a molten state.

2. The package of claim 1 further comprising the shrunken heat shrink tubing surrounding the metal jacket.

3. The package of claim 1 wherein the metal jacket is made of a metal selected from the group consisting of lead, tin, bismuth, indium, gallium and alloys thereof.

4. The package of claim 1 further comprising a first rigid tube disposed between the sensor and metal jacket, wherein the rigid tube surrounds the sensor.

5. The package of claim 4 wherein the rigid tube is wet by the low melting point metal.

6. The package of claim 4 further comprising a second rigid tube between the first rigid tube and the metal jacket.

7. The package of claim 1 wherein the low melting point metal jacket has a melting point less than about 400 degrees Celsius.

8. The package of claim 1 wherein the low melting point metal jacket has a melting point less than about 350 degrees Celsius.

9. The package of claim 1 wherein the low melting point metal jacket has a melting point less than or equal to a temperature that causes the heat-shrink tubing to shrink.

10. The package of claim 1 wherein the sensor is for use in a downhole.

11. The package of claim 1, further comprising a coil wrapped around the sensor and within the heat shrink tubing, wherein the coil is embedded within the metal jacket.

12. The package of claim 1, further comprising a plurality of short tubing pieces disposed around the sensor and within the heat shrink tubing, wherein the short tubing pieces are embedded within the metal jacket.

13. A method for packaging an optical fiber sensor, comprising the steps of:
   a) disposing the sensor within a heat shrink tube;
   b) disposing a low melting point metal within the heat shrink tube;
   c) heating the heat shrink tube and low melting point metal so that the tube shrinks and the metal melts.

14. The method of claim 13 wherein the low melting point metal is provided in the shape of a tube or coil before step (c).

15. The method of claim 13 wherein the heat-shrink tube and metal are heated by scanning the location of applied heat so as to minimize trapped air bubbles.

16. The method of claim 13 wherein step (c) is performed in vacuum.

17. The method of claim 13 wherein the sensor is disposed in the heat shrink tube after the metal is melted but before the tubing has shrunk.

18. An optical fiber package, comprising:
   at least one optical fiber;
   a metal or alloy encasing said at least one optical fiber; and
   heat shrink tubing encasing said metal or alloy, wherein said metal or alloy has a melting point which is less than a temperature at which said heat shrink tubing shrinks.

19. The optical fiber package of claim 18, further comprising at least one rigid tube positioned between said at least one optical fiber and said metal or alloy casing.

20. The optical fiber package of claim 19 further comprising at least a second rigid tube positioned over said at least one rigid tube.

21. The optical fiber package of claim 19 further comprising bonds between said at least one optical fiber and said at least one rigid tube.

22. The optical fiber package of claim 18 further comprising a metallic coil positioned in said metal or alloy casing.

23. The optical fiber package of claim 20 wherein said at least a second rigid tube is of a different length than said at least one rigid tube.

24. The optical fiber package of claim 18 wherein said at least one optical fiber includes at least two optical fibers.

* * * * *